United States Patent
Ahmad et al.

(10) Patent No.: US 9,092,318 B2
(45) Date of Patent: Jul. 28, 2015

(54) METHOD OF ALLOCATING REFERENCED MEMORY PAGES FROM A FREE LIST

(71) Applicant: VMware, Inc., Palo Alto, CA (US)

(72) Inventors: Irfan Ahmad, Mountain View, CA (US); Gabriel Tarasuk-Levin, Palo Alto, CA (US); Ali Mashtizadeh, Palo Alto, CA (US); Philip Peter Moltmann, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 220 days.

(21) Appl. No.: 13/760,837

(22) Filed: Feb. 6, 2013

(65) Prior Publication Data

US 2013/0205113 A1   Aug. 8, 2013

Related U.S. Application Data

(60) Provisional application No. 61/595,518, filed on Feb. 6, 2012.

(51) Int. Cl.
*G06F 12/02* (2006.01)
*G06F 9/50* (2006.01)

(52) U.S. Cl.
CPC ............ *G06F 12/023* (2013.01); *G06F 9/5016* (2013.01); *G06F 12/0284* (2013.01); *G06F 2212/152* (2013.01)

(58) Field of Classification Search
CPC ................ G06F 9/45533; G06F 12/08; G06F 2212/205; G06F 12/1009; G06F 12/1475; G06F 9/5016; G06F 2009/4557; G06F 9/45558; G06F 17/30233; G06F 12/023
See application file for complete search history.

(56) References Cited

U.S. PATENT DOCUMENTS

| | | | | |
|---|---|---|---|---|
| 6,408,313 | B1* | 6/2002 | Campbell et al. | 711/170 |
| 7,822,927 | B1* | 10/2010 | Scheer | 711/133 |
| 2004/0019891 | A1* | 1/2004 | Koenen | 718/102 |
| 2004/0107318 | A1* | 6/2004 | Bono et al. | 711/118 |
| 2004/0168037 | A1* | 8/2004 | Dearth et al. | 711/173 |
| 2005/0246452 | A1* | 11/2005 | Spencer et al. | 709/250 |
| 2005/0273568 | A1* | 12/2005 | Blandy | 711/170 |
| 2006/0026372 | A1* | 2/2006 | Kim et al. | 711/160 |
| 2006/0277389 | A1* | 12/2006 | Hepkin et al. | 711/203 |
| 2007/0204117 | A1* | 8/2007 | Van Riel et al. | 711/159 |
| 2008/0077764 | A1* | 3/2008 | Pierce et al. | 711/200 |
| 2008/0235499 | A1* | 9/2008 | Togawa | 712/234 |
| 2009/0164715 | A1* | 6/2009 | Astigarraga et al. | 711/112 |

(Continued)

OTHER PUBLICATIONS

IBM Memory Management: VMRM-CMM and CMMA; as published on the internet Aug. 2008 at http://www.vm.ibm.com/perf/reports/zym/html/530cmm.html.*
IBM Optimizing AIX 5L performance: Tuning your memory settings, Part 1; May 2007; http://www.ibm.com/developerworks/aix/library/au-aixoptimization-memtun1/.*

(Continued)

*Primary Examiner* — Reginald Bragdon
*Assistant Examiner* — Paul Knight

(57) ABSTRACT

Memory pages that are allocated to a memory consumer and continue to be accessed by the memory consumer are included in a free list, so that they may be immediately allocated to another memory consumer as needed during the course of normal operation without preserving the original contents of the memory page. When a memory page in the free list is accessed to perform a read, a generation number associated with the memory page is compared with a stored copy. If the two match, the read is performed on the memory page. If the two do not match, the read is not performed on the memory page.

20 Claims, 12 Drawing Sheets

(56) References Cited

U.S. PATENT DOCUMENTS

| | | | |
|---|---|---|---|
| 2009/0214028 A1* | 8/2009 | Schneider | 380/44 |
| 2009/0307462 A1* | 12/2009 | Fleming et al. | 711/206 |
| 2010/0235542 A1* | 9/2010 | Visharam et al. | 709/246 |
| 2011/0231826 A1* | 9/2011 | Narasimhan | 717/128 |

OTHER PUBLICATIONS

Microsoft Remote Differential Compression; at published on the internet Nov. 2010; http://msdn.microsoft.com/en-us/library/aa372948(Vs.85).aspx.*

* cited by examiner

METHOD OF ALLOCATING REFERENCED MEMORY PAGES FROM A FREE LIST

CROSS-REFERENCE TO RELATED APPLICATIONS

This application claims priority from provisional patent application Ser. No. 61/595,518, filed Feb. 6, 2012, entitled "Method of Allocating Referenced Memory Pages from a Free List," the entire contents of which is hereby incorporated by reference herein.

BACKGROUND

Computing systems typically allocate memory using a regime that guarantees the continued availability of the allocated memory. If a memory consumer requests an allocation of memory and there is sufficient free memory to satisfy the request, then the request is granted. The memory consumer may subsequently use the allocated memory until the memory consumer process terminates or explicitly releases the allocated memory. If sufficient free memory is not available to accommodate the memory allocation request, then the request is denied. Certain memory consumers are tolerant of being denied a memory allocation request, but some memory consumers fail catastrophically if they are denied a memory allocation request. Some kernel space memory consumers are intolerant of being denied memory allocation requests as they are critical to the proper operation of their respective systems services. To avoid catastrophic failure of these critical memory consumers, many computing systems are configured to operate with a significant reserve of memory that purposefully remains idle.

For example, in a conventional virtual machine (VM) setting, proper execution of each VM depends on an associated virtual machine monitor (VMM) having sufficient memory. The VMM may request a memory allocation during normal operation. If a host system has insufficient memory for the VMM at some point during VM execution, then the VMM is forced to kill its VM. If the average amount of idle memory falls below a predetermined threshold, then the host system may be reconfigured to reestablish a certain minimum amount of idle memory. Process migration may be used to rebalance VM system loads among host systems, thereby increasing idle memory on the host system encountering memory pressure. While maintaining an idle memory reserve serves to avoid catastrophic failures, this idle memory represents a potentially expensive unused resource.

SUMMARY

One or more embodiments of the present invention provide techniques for managing memory in a way that better utilizes idle memory resources. These techniques allow memory pages that are allocated to a memory consumer and continue to be accessed by the memory consumer to be included in a free list, so that they may be immediately allocated to another memory consumer as needed during the course of normal operation without preserving the original contents of the memory page. In one embodiment, such techniques allow all memory resources to be used without jeopardizing system stability.

A method of managing memory using a free list of memory pages, according to an embodiment of the present invention, includes the steps of receiving a memory allocation request from a memory consumer, selecting a memory page from the free list, and allocating the memory page to the memory consumer. The free list includes the memory page even though the memory page has been allocated to the memory consumer, and the memory consumer retains a reference to the allocated memory page. In one embodiment, the memory page is removed from the free list upon allocation and then returned to a tail of the free list to be made available for allocation to other memory consumers.

A method of performing a read on a memory page that is in a free list of memory pages, according to an embodiment of the present invention, includes the steps of performing a read on a memory page that is in the free list, and retrieving after the read a current generation number associated with the memory page. If the current generation number retrieved after the read matches the stored copy of the generation number, the read data is considered valid. On the other hand, if the current generation number retrieved after the read does not match the stored copy of the generation number, then the read data is considered invalid.

Further embodiments of the present invention include, without limitation, a non-transitory computer-readable medium that includes instructions that enable a processing unit to implement one or more aspects of the above methods as well as a computer system configured to implement one or more aspects of the above methods.

DETAILED DESCRIPTION

A. System Architecture

Figure 1A:
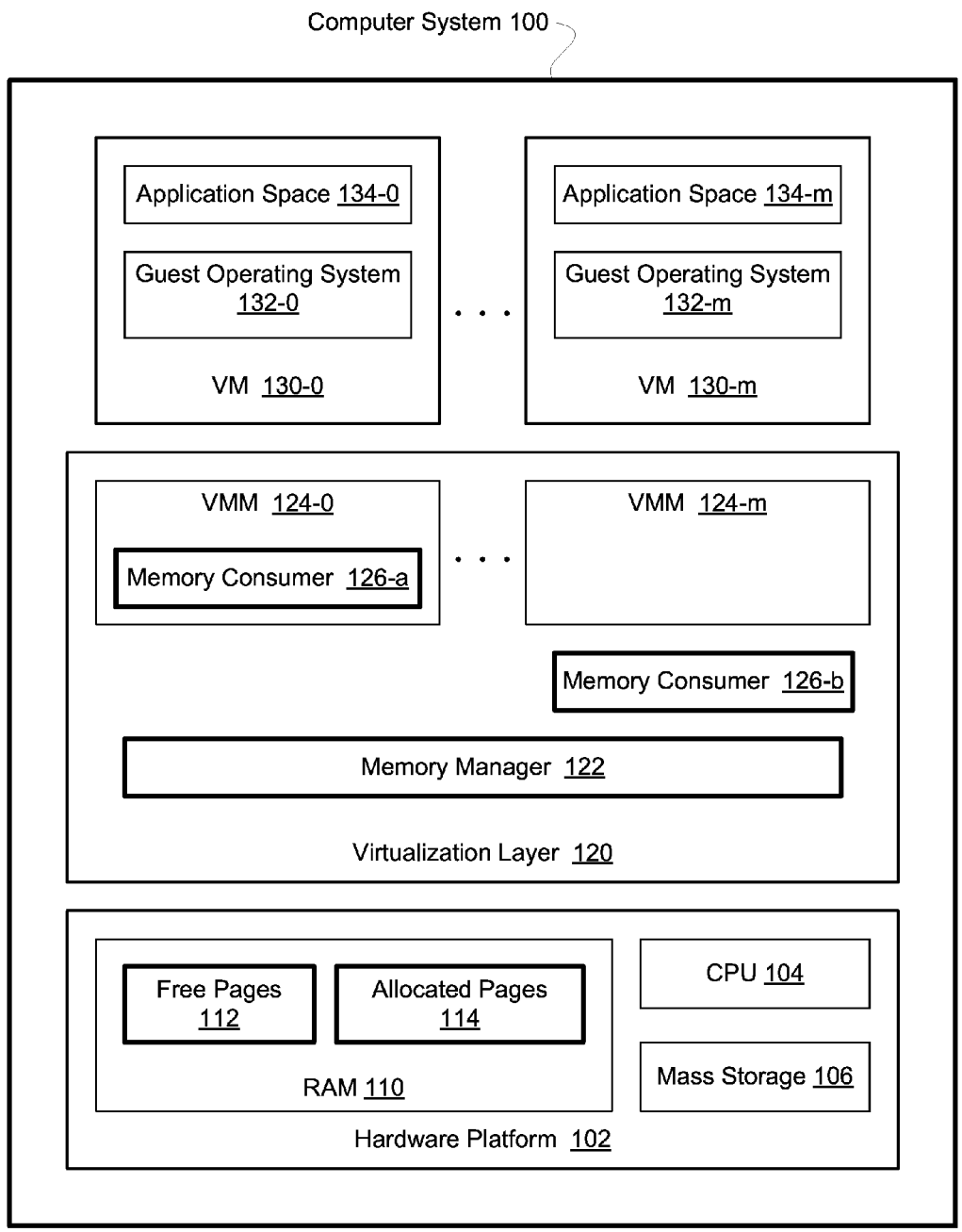
FIG. 1A depicts a block diagram of a computer system configured to implement one or more aspects of the present invention.

FIG. 1A depicts a block diagram of a computer system 100 configured to implement one or more aspects of the present invention. The computer system 100 may be constructed as a desktop, laptop or server grade hardware platform 102, including different variations of the x86 architecture platform or any other technically feasible architecture platform. Such a hardware platform 102 may include a central processing unit (CPU) 104, random access memory (RAM) 110, mass storage (such as a hard disk drive) 106 and other I/O devices such as a mouse and keyboard (not shown). RAM 110 is organized as pages of memory. Each page of memory typically comprises a fixed amount of storage.

A virtualization layer 120 is installed on top of hardware platform 102 to support a virtual machine execution space, within which at least one virtual machine (VM) 130-0 is instantiated for execution. Additional VM instances 130 may coexist under control of the virtualization layer 120, which is configured to map the physical resources of hardware platform 102 (e.g., CPU 104, RAM 110, etc.) to a set of corresponding "virtual" (emulated) resources for each virtual machine 130. The virtual resources are provided by a corresponding virtual machine monitor 124, residing within the virtualization layer 120. The virtual resources may function as the equivalent of a standard x86 hardware architecture, such that any x86 supported operating system, e.g., Microsoft Windows, Linux, Solaris x86, NetWare, FreeBSD, etc., may be installed as a guest operating system 132. The guest operating system 132 facilitates application execution within an application space 134. In one embodiment, the virtualization layer 120 comprises a hypervisor within VMware® vSphere® virtualization product, available from VMware, Inc. of Palo Alto, Calif. In an alternative embodiment, a host operating system is installed between the virtualization layer 120 and hardware platform 102. In such an embodiment, the virtualization layer 120 operates above an abstraction level provided by the host operating system. It should be recognized that the various terms, layers and categorizations used to describe the components in FIG. 1A may be referred to differently without departing from their functionality or the spirit or scope of the invention.

The virtualization layer 120 includes a memory manager 122 configured to allocate pages of memory residing within RAM 110. The pages of memory are generally organized as allocated pages 114 and free pages 112. The allocated pages 114 are pages of memory that are reserved for use by a memory consumer 126. The free pages 112 represent a free page pool comprising pages of memory that are free for allocation to a memory consumer 126. A memory consumer 126 may reside within a VMM 124 or any other portion of the virtualization layer 120.

Figure 1B:
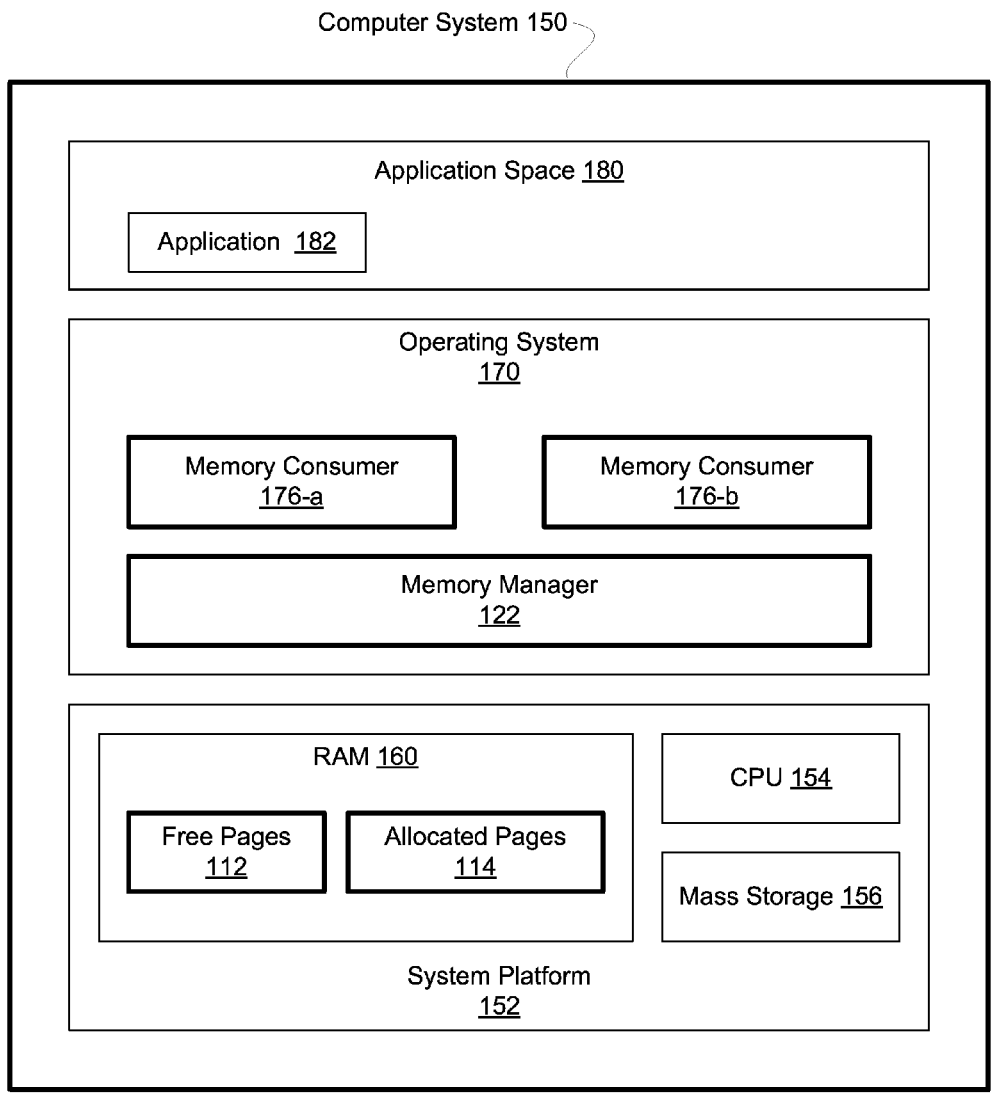
FIG. 1B depicts a block diagram of a computer system configured to implement one or more aspects of the present invention.

FIG. 1B depicts a block diagram of a computer system 150 configured to implement one or more aspects of the present invention. The computer system 150 includes a system platform 152, and an operating system 170 configured to provide an application space 180 for execution of an application 182. In one embodiment, system platform 152 is constructed as a physical desktop, a physical laptop, an embedded processor, a mobile processing platform, a physical server system, or any other computing platform comprising a processor and random access memory. In an alternative embodiment, the system platform 152 comprises a VM with operating system 170 installed as a guest operating system. In either embodiment, the system platform 152 may include different variations of the x86 architecture platform or any other technically feasible architecture platform. Such a system platform 152 may include a CPU 154, RAM 160, mass storage 156 and other I/O devices such as a mouse and keyboard (not shown). Each system platform component may be a physical subsystem or a virtual subsystem. Each page of memory typically comprises a fixed amount of storage.

The operating system 170 includes a memory manager 122 configured to allocate pages of memory residing within RAM 160. The pages of memory are generally organized as a set of allocated pages 114 and a set of free pages 112. The allocated pages 114 are pages of memory that are reserved for use by a memory consumer 176. The free pages 112 are pages of memory that are free for allocation to a memory consumer 176. In one embodiment, the memory consumer 176 resides within any technically feasible portion of the operating system 170, such as a kernel space of the operating system 170. In alternative embodiments, the memory consumer 176 resides within a non-kernel execution space, such as in a user space. In one embodiment, the memory manager 122 resides within the kernel of the operating system 170.

In a conventional memory management regime, pages categorized as free pages are not in use by any memory consumer. In such a regime, each free page is presumed to not store presently valid data, and each allocated page is reserved by a memory consumer regardless of whether the page presently stores valid data. Furthermore, in a conventional buffer cache, associated pages are allocated exclusively to the buffer cache, and only trusted users, such as the core of the operating system, may access these pages of the buffer cache. By contrast, pages of yankable memory are not allocated exclusively to a memory consumer, and yankable memory pages may be accessed by any appropriately configured memory consumer, even user-level applications and third party drivers, affording a yankable memory regime greater flexibility and greater usability by more classes of consumers.

In addition, the conventional buffer cache maintains its own list of buffered, freeable memory pages or has to be at least notified when a memory page is not free anymore. The memory management techniques according to one or more embodiments of the present invention may be implemented without any such overhead.

B. Yankable Memory

A memory management regime is disclosed herein, whereby a page of memory may be characterized as allocated, idle, or yankable. Allocated pages 114 are reserved in a conventional manner. However, free pages 112 are categorized as being either idle or yankable. Idle pages have been released from an associated memory consumer with no expectation of further use by the memory consumer. Yankable pages have been returned to the set of free pages 112 from an associated memory consumer, with an expectation that the yankable pages may be beneficially accessed at a later time. Both idle and yankable pages are available to be allocated and become allocated pages 114.

A yankable memory consumer may, at any time, lose access to data stored within one or more pages of yankable memory. Therefore, a yankable memory consumer needs to be able to restore or retrieve data associated with lost pages of memory from a reliable source, or continue properly without the lost pages. One example of a yankable memory consumer that is able to operate correctly despite potential loss of pages of memory is a read cache. The read cache retrieves data from a backing store that forms a reliable source of data and stores the data in yankable pages. If certain yankable pages remain available, then the read cache performance is improved. If certain yankable pages are lost due to reallocation by the memory manager 122, then the read cache performance is diminished. Regardless of whether the yankable pages remain available, the read cache can continue to operate correctly.

In one embodiment, yankable pages are allocated according to conventional techniques but are returned to the free page pool. In one example, a memory consumer requests an allocation of at least one page of memory from the memory manager 122. The memory manager 122 then grants the allocation request. At this point, the memory consumer may fill the page of memory, mark the page as read-only, and subsequently return the page to the memory manager 122 as a yankable page of memory. The memory manager 122 then adds the yankable page of memory back to the free page pool. The memory consumer retains a reference to the yankable page of memory for later access. If the yankable page of memory, now among the free pages 112, has not been reallocated, then the memory consumer may access the yankable page of memory on a read-only basis. In certain embodiments, the memory consumer may request that the memory manager 122 reallocate the yankable page of memory to the memory consumer, for example, if the memory consumer needs to write new data into the yankable page of memory. After the write, the memory consumer may release the yankable page of memory back to the free page pool.

In one embodiment, a public generation number is applied to each page of memory being managed by the memory manager 122. Public generation numbers may be initialized to zero during an initial boot process. The public generation number of a page of memory is incremented prior to the page of memory being allocated to a particular memory consumer. If any generation number overflows as a result of being incremented, then all memory consumers of yankable memory should be informed that all of their yankable memory pages are invalid and no longer available. Any technically feasible technique may be used to invalidate yankable memory pages. After an overflow event, generation numbers may be cleared and new pages of yankable memory may be allocated again. Upon successful allocation, the memory consumer retains a private copy of each generation number for each yankable page of memory. The memory manager 122 separately maintains the public generation number for each page of memory, regardless of whether a particular memory consumer treats the page of memory as yankable. When a specific memory consumer reads a particular yankable page of memory, if the private generation number matches the public generation number associated with the page of memory, then it is determined that the page of memory was not allocated to another memory consumer and data stored within the page of memory is valid for the specific memory consumer. However, if the private generation number does not match the public generation number, then it is determined that the page of memory was allocated to another memory consumer and the data stored within the page of memory is not valid for the specific memory consumer. This embodiment is described in greater detail below in FIGS. 2A-2F.

Figure 2A:
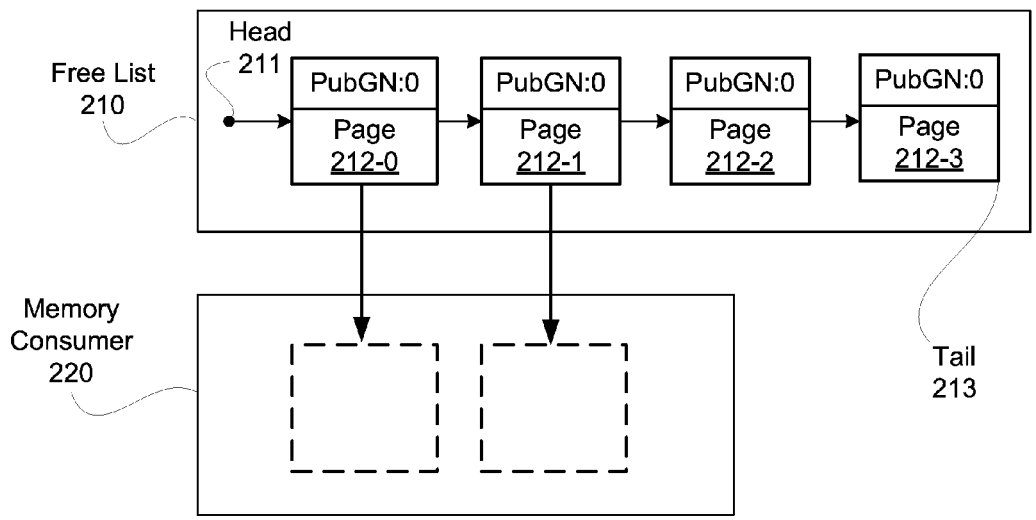
FIG. 2A depicts a memory consumer requesting pages of memory.

FIG. 2A depicts a memory consumer 220 requesting pages of memory 212-0, 212-1. Upon receiving an allocation request from the memory consumer 220, the memory manager 122 of FIGS. 1A-1B allocates pages of memory 212-0 and 212-1 to the memory consumer 220. Public generation numbers for each page of memory 212 may be initialized to zero once at boot time. The two pages of memory 212-0, 212-1 are allocated from a free list 210. In one embodiment, the free list 210 is an ordered list of pages associated with the free page pool. The free list 210 may be implemented using any technically feasible list data structure. In one embodiment, the free list 210 implements a data structure that preserves list order. A list head 211 indicates which page 212 should be allocated from the free list 210 first by the memory manager 122. Upon allocation of the pages 212-0 and 212-1, the public generation numbers for pages of memory 212-0 and 212-1 are incremented to one (1), as shown below in FIG. 2B. The memory consumer 220 receives references to pages of memory 212-0, 212-1 to access the pages of memory 212. Each reference may include a pointer to a location in memory for the corresponding page of memory 212. Each reference may also include the public generation number for the page of memory 212.

Figure 2B:
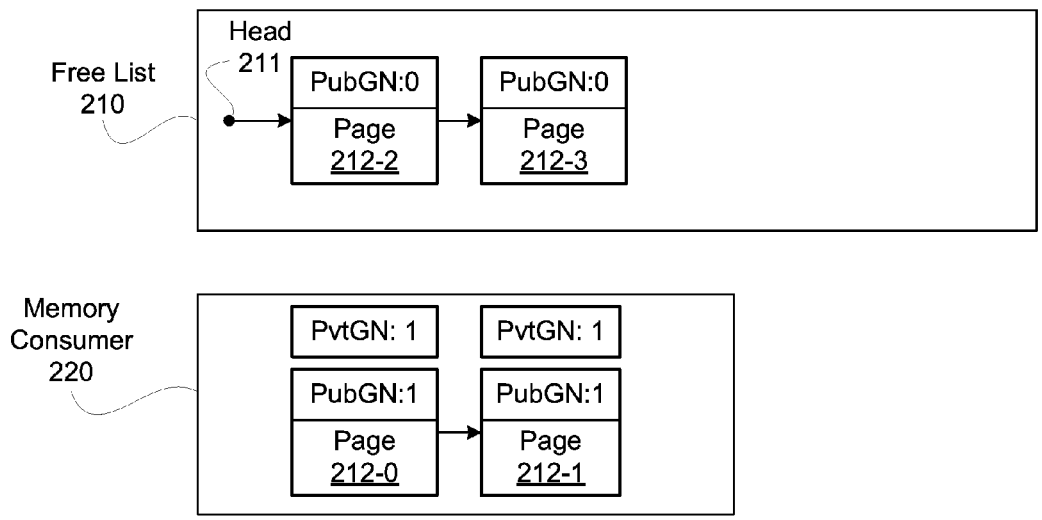
FIG. 2B depicts the memory consumer having pages of allocated memory.

FIG. 2B depicts the memory consumer 220 having pages of allocated memory 212-0, 212-1. As shown, each public generation number is set to one (1). Subsequent to successful allocation of the pages 212-0, 212-1, the memory consumer copies the public generation numbers to corresponding private generation numbers. As shown, each private generation number associated with a page 212-0, 212-1 is a copy of the corresponding public generation number.

Figure 2C:
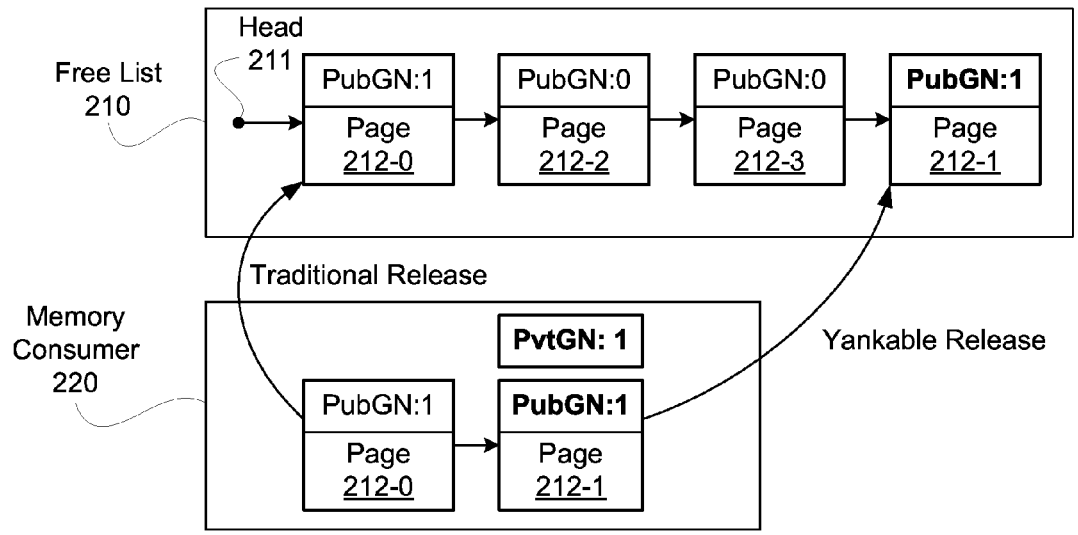
FIG. 2C depicts the memory consumer releasing one page of memory to the front of a free list and another page of memory to the back of the free list.

FIG. 2C depicts the memory consumer 220 releasing one page of memory 212-0 to the head 211 of a free list 210 and another page of memory 212-1 to the back of the free list 210. A traditional release is applied to page 212-0 because the memory consumer 220 needs no further access to the page 212-0. The page 212-0 should be added to the head 211 of the free list and may be first in line to be reallocated by the memory manager 122. A yankable release is applied to page 212-1 because the memory consumer 220 may benefit from further access to the page 212-1. The page 212-1 is added to a tail 213 (see FIG. 2A) of the free list 210 because reallocating the page 212-1 should be avoided if possible, and the tail 213 of the free list 210 represents the last possible page 212 that may be allocated from the free list 210.

Other yankable pages 212 may be added behind page 212-1 over time, thereby increasing the likelihood that the page 212-1 will be reallocated. However, placing yankable pages at the tail 213 of the free list establishes a low priority for reallocation of the yankable pages, thereby increasing the likelihood that a given yankable page will be available for use when an associated memory consumer attempts access. Prior to the yankable release of page 212-1, the memory consumer 220 copies the public generation number for page 212-1 and stores the copy as a private generation number for page 212-1. In future attempts to access page 212-1, the memory consumer compares the private generation number to a then prevailing public generation number. If the private generation number matches the public generation number, then the memory consumer 220 may access data within the page 212-1. The memory consumer 220 does not need to store a private generation number for page 212-0 because page 212-0 is released according to a traditional (non-yankable) release.

Figure 2D:
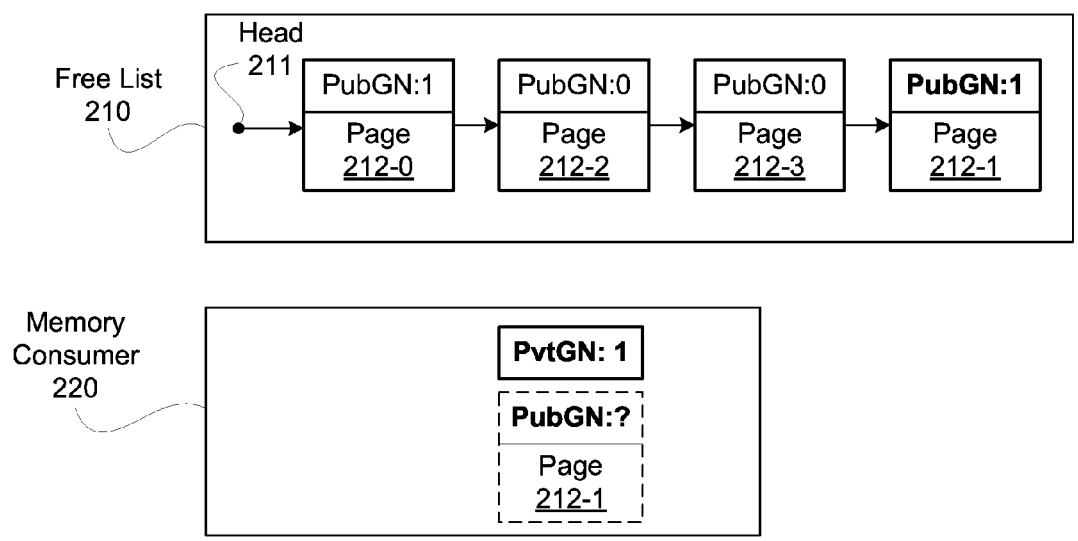
FIG. 2D depicts the memory consumer retaining a reference to the page of yankable memory.

FIG. 2D depicts the memory consumer 220 retaining a reference to the page of yankable memory. The reference is depicted as a dashed outline for page 212-1 within memory consumer 220. Immediately subsequent to returning the page 212-1 to the free list 210, the public generation number is one (1) for page 212-1, and the private generation number stored within the memory consumer 220 for page 212-1 is also one, meaning the page is currently valid for access by memory consumer 220.

Figure 2E:
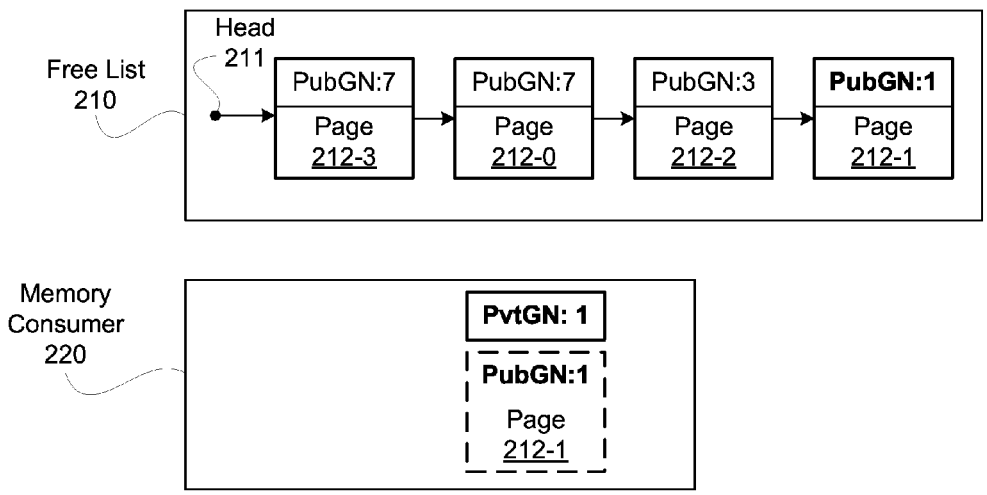
FIG. 2E depicts the yankable page in a valid state with respect to the memory consumer.

FIG. 2E depicts the yankable page 212-1 in a valid state with respect to the memory consumer 220. After some arbitrary amount of time, the memory manager 122 has allocated pages 212-3, 212-0, and 212-2, as indicated by increasing public generation numbers for the pages. These pages have also been released during that time, as indicated by their presence in the free list 210. However, the memory manager 122 has not yet allocated page 212-1, as indicated by a public generation number matching the private generation number for page 212-1. In this example, the public and private generation numbers are both equal to one (1) and the memory consumer 220 may access the page 212-1.

Figure 2F:
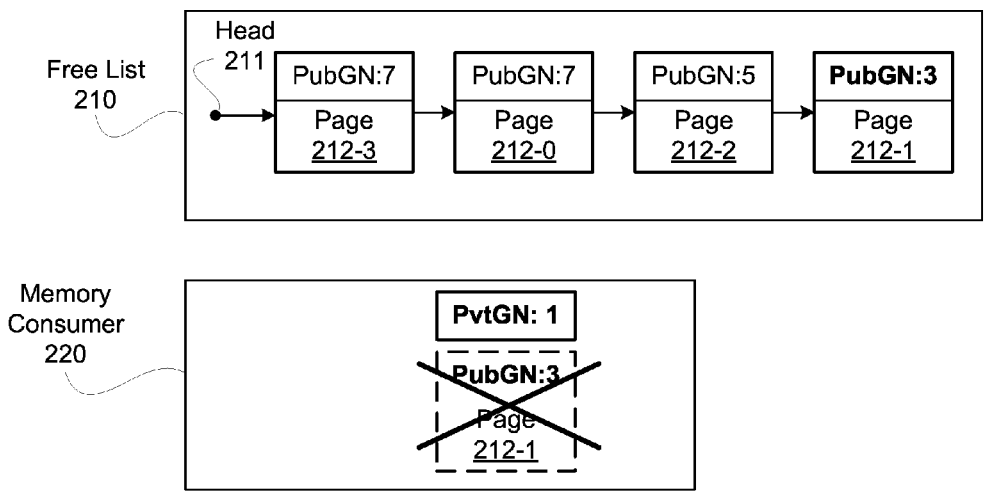
FIG. 2F depicts the yankable page in an invalid state with respect to the memory consumer.

FIG. 2F depicts the yankable page 212-1 in an invalid state with respect to the memory consumer 220. After some arbitrary amount of time, the memory manager 122 has allocated pages 212-3, 212-0, 212-2, and 212-1 to other memory consumers at some point. These pages have also been released during that time, as indicated by their presence in the free list 210. In this example, the public and private generation numbers are not equal for page 212-1 the memory consumer 220 may not access the page 212-1. Alternatively, page 212-1 may not even be in the free list 210 if the page 212-1 is in the set of allocated pages 114. Regardless of the disposition of the page 212-1, the public generation number will not match the private generation number stored within the memory consumer 220 if the page 212-1 was allocated to another memory consumer by the memory manager 122 subsequent to the yankable release.

In one embodiment, memory consumer 220 is provided with a memory manager application programming interface (API) comprising at least a yankable memory declaration API call and a yankable memory read API call. The yankable memory declaration API call causes the memory manager 122 to return a declared page to the free list 210, as described previously in FIG. 2C. The yankable memory read API call compares public and private generation numbers for a requested page and either returns data if the public and private generation numbers match, or returns a read error if the generation numbers do not match. One optional yankable memory API comprises a reallocate request that pulls a requested page from the free list 210 if the public and private generation numbers match and allocates the page to the requesting memory consumer. Persons skilled in the art will understand that any technically feasible technique may be used to uniquely associate a page of memory with a memory consumer and that the regime of generation numbers is one exemplary technique. Another exemplary technique involves using a unique process identification number in place of a generation number, and so forth.

In an alternative embodiment, a yankable memory API based on a try-catch semantic is implemented to provide yankable memory management. The try-catch API includes a yankable allocation API call and a yankable declaration API call. The yankable allocation API call allocates a page and maps the page as a read-write page in a special section of virtual memory that is accessible to the memory consumer 220. The memory consumer 220 may then write to the page to fill the page with any appropriate data. The memory consumer then calls the yankable declaration API call with the page, causing the page mapping to be switched to read-only status. If the page subsequently needs to be yanked away and allocated to a different memory consumer, the mapping is cleared. To later access the yankable page, a try API call is executed on the page. If the try call passes, then the page may be read. Otherwise, a catch method is executed by the memory consumer 220. The try-catch semantic avoids a page fault being triggered by the memory consumer 220. On what would otherwise be a page fault condition, the memory consumer 220 is able to execute a catch method instead.

C. Free List Allocation Priority

Figure 3:
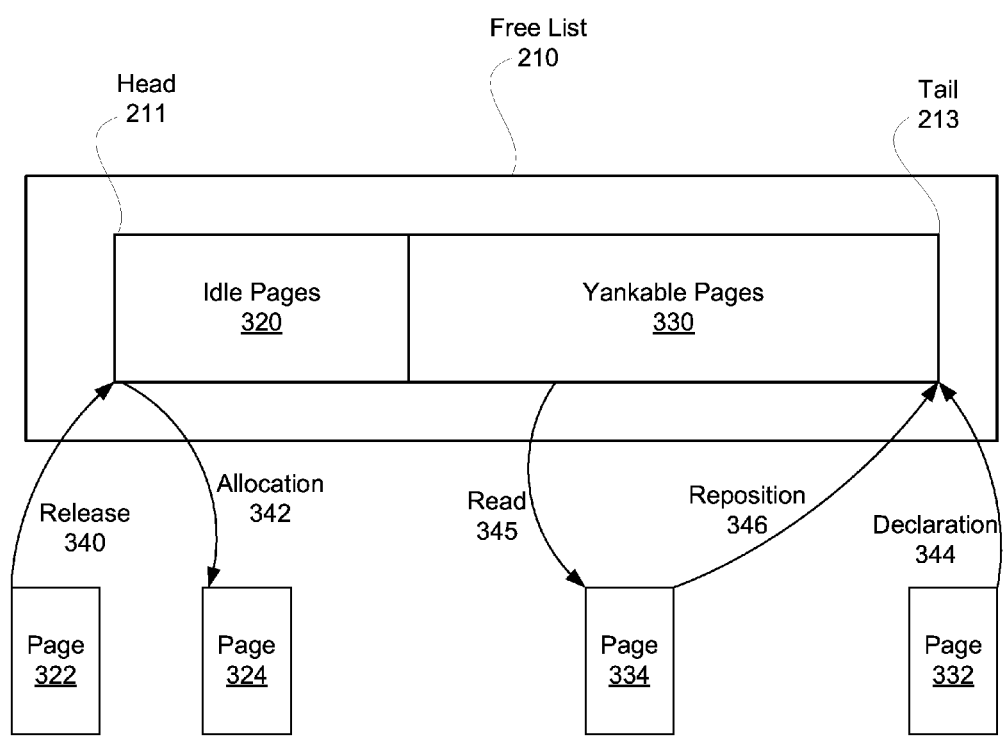
FIG. 3 illustrates reordering pages in a free list based on access to the pages, according to one embodiment of the invention.

FIG. 3 illustrates reordering pages in a free list 210 based on access to the pages, according to one embodiment of the invention. The free list 210 includes idle pages 320 that are not referenced by any memory consumers, and yankable pages 330 that are each referenced by at least one memory consumer, such as memory consumer 220, as described previously. A memory allocation operation 342 selects a page 324 from the head 211 of the free list 210. If there are one or more pages within the set of idle pages 320, then page 324 is allocated from the set of idle pages. Otherwise, page 324 is allocated from the set of yankable pages 330. A traditional release operation 340 releases a page 322 permanently from the memory consumer 220. No further reference to page 322 is available unless page 322 is allocated to the memory consumer 220 in a separate allocation operation.

In one embodiment, a yankable page declaration operation 344 places an associated yankable page 332 at the tail 213 of the free list 210. The page 332 remains accessible to an associated memory consumer until page 332 is allocated to a different memory consumer. A yankable page 334 may be read via a read operation 345. As described previously, the read operation 345 may comprise checking a page attribute, such as a generation number or mapping disposition. The fact that an associated memory consumer read the yankable page 334 indicates the page is likely of some future value to the memory consumer. To increase the likelihood that the yankable page 334 will be available to the associated memory consumer, the yankable page 334 is repositioned at the tail 213 of the free list 210 via a repositioning operation 346. In one or more embodiments of the invention, the process of reading and repositioning yankable pages implements a least recently used (LRU) allocation policy for yankable pages within the free list 210. In certain embodiments involving hardware assisted address mapping, repositioning of a page to the tail 213 of the free list 210 may be indicated via a page table entry access bit (or simply 'A' bit).

Persons skilled in the art will recognize that the techniques disclosed herein for implementing a yankable memory regime are exemplary and that other implementations of a yankable memory regime are within the scope and spirit of the present invention.

Figure 4A:
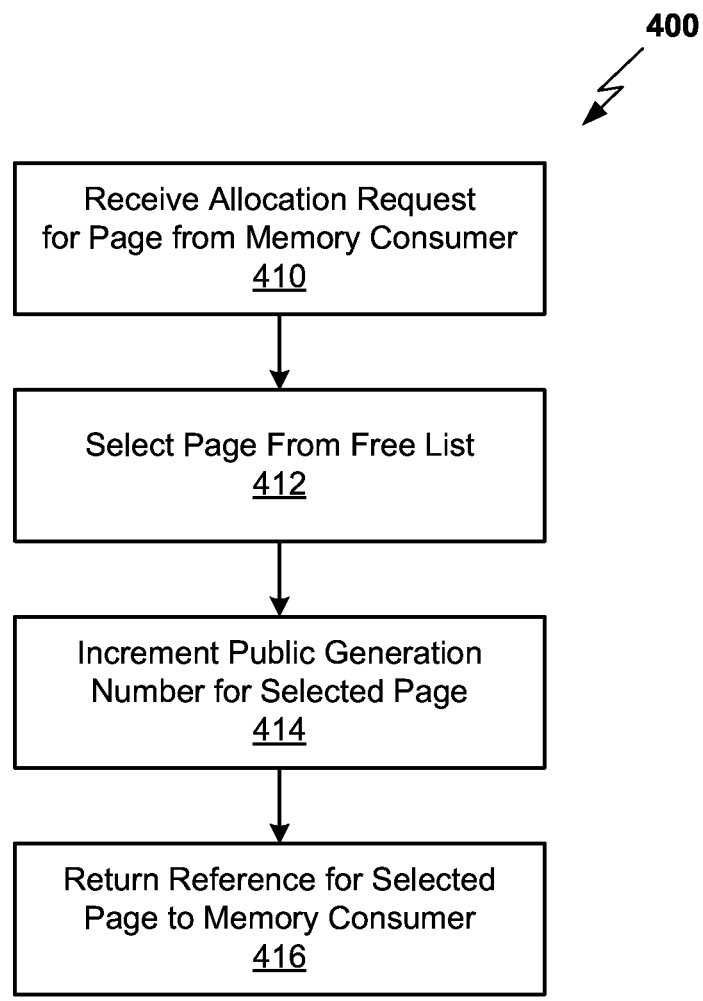
FIG. 4A is a flow diagram of method steps, performed by a memory manager, for allocating a page of memory.

FIG. 4A is a flow diagram of method steps 400, performed by a memory manager, for allocating a page of memory. Although the method steps are described in conjunction with the system of FIGS. 1-3, it should be understood that there are other systems in which the method steps may be carried out without departing the scope and spirit of the present invention.

The method begins in step 410, where the memory manager, such as memory manager 122 of FIGS. 1A-1B, receives an allocation request for a page of memory from a memory consumer, such as consumer 220 of FIGS. 2A-2F. In step 412, the memory manager 122 selects a page from the free list 210. In one embodiment, the memory manager 122 selects a page from the head 211 of the free list 210. In step 414 the memory manager increments a public generation number associated with the selected page. Any technically feasible technique or data structure may be implemented to store public generation numbers for pages of memory. For example, an entry field in a page table entry may be used to store public generation numbers. In step 416, the memory manager 122 returns a reference for the selected page to the memory consumer 220. The method terminates in step 416.

Figure 4B:
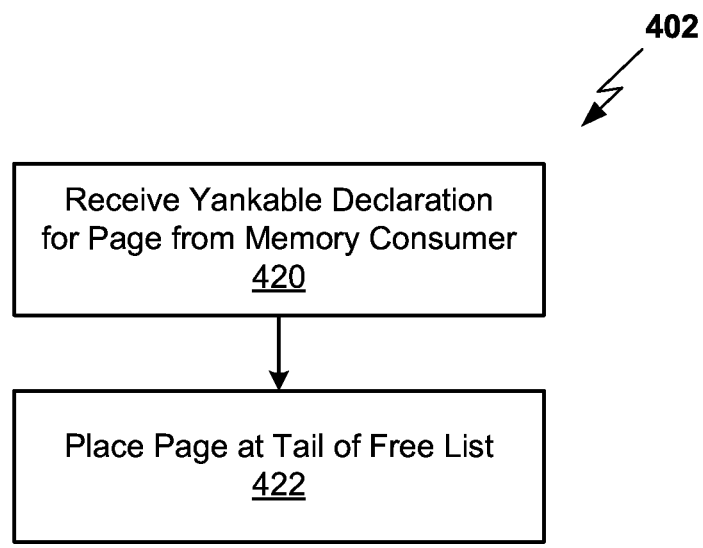
FIG. 4B is a flow diagram of method steps, performed by a memory manager, for declaring a page of memory as being yankable.

FIG. 4B is a flow diagram of method steps 402, performed by a memory manager, for declaring a page of memory as being yankable. Although the method steps are described in conjunction with the system of FIGS. 1-3, it should be understood that there are other systems in which the method steps may be carried out without departing the scope and spirit of the present invention.

The method begins in step 420, where the memory manager receives a yankable declaration, designating a page as yankable, from a memory consumer. In step 422, the memory manager places the page at the tail of the free list. The method terminates in step 422.

Figure 4C:
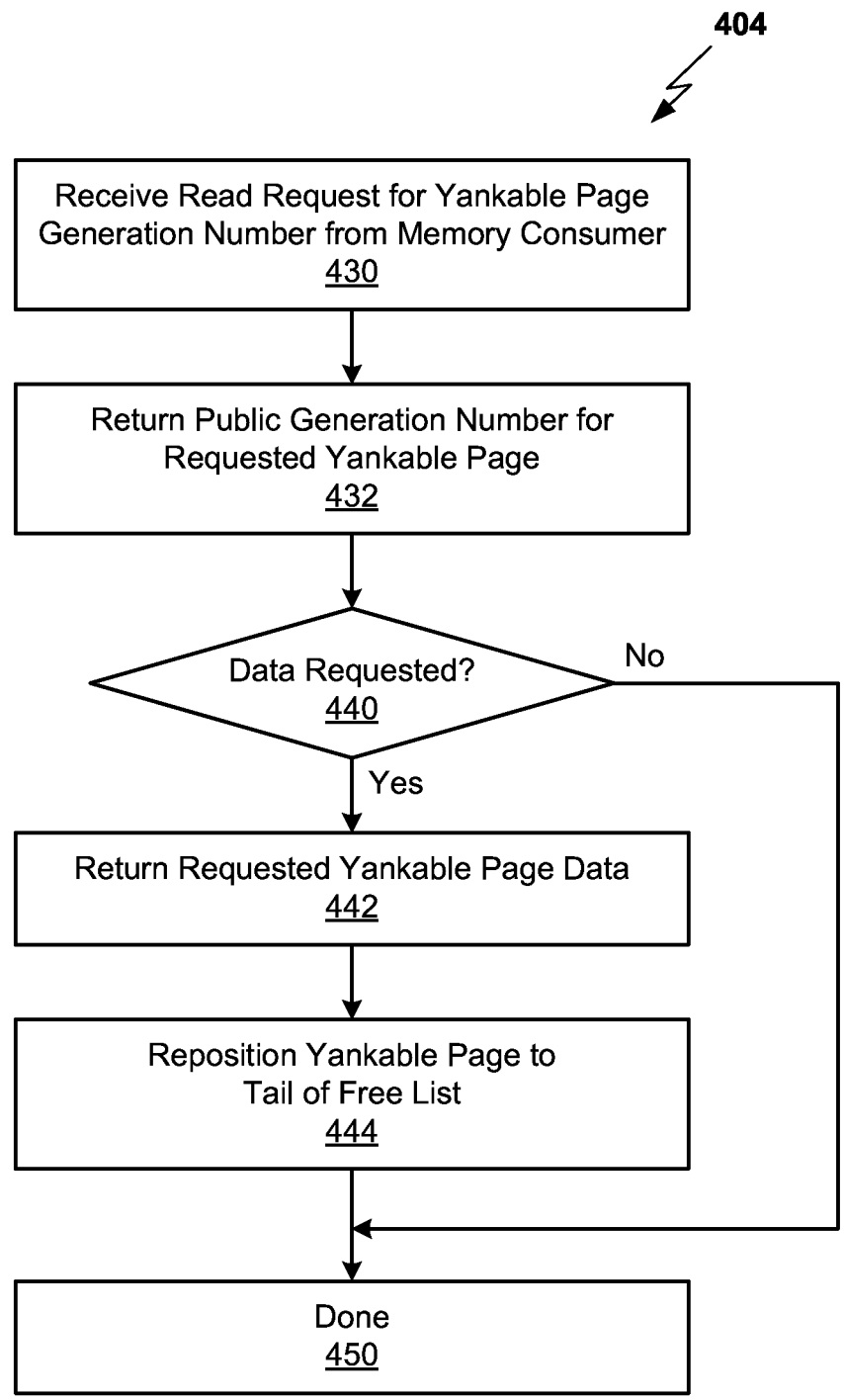
FIG. 4C is a flow diagram of method steps, performed by a memory manager, for reading a page of memory.

FIG. 4C is a flow diagram of method steps 404, performed by a memory manager, for reading a page of memory. Although the method steps are described in conjunction with the system of FIGS. 1-3, it should be understood that there are other systems in which the method steps may be carried out without departing the scope and spirit of the present invention.

The method begins in step 430, where the memory manager receives a request for a yankable page generation number for a specified page from the memory consumer. In step 432, the memory manager returns a public generation number for the requested yankable page to the memory consumer. If, in step 440, data associated with the specified page is requested, then the method proceeds to step 442, where the memory manager returns requested data from the specified page. In step 444, the memory manager repositions the specified yankable page to the tail of the free list. The method terminates in step 450.

Returning to step 440, if data associated with the specified page is not requested, then the method terminates in step 450.

Figure 5A:
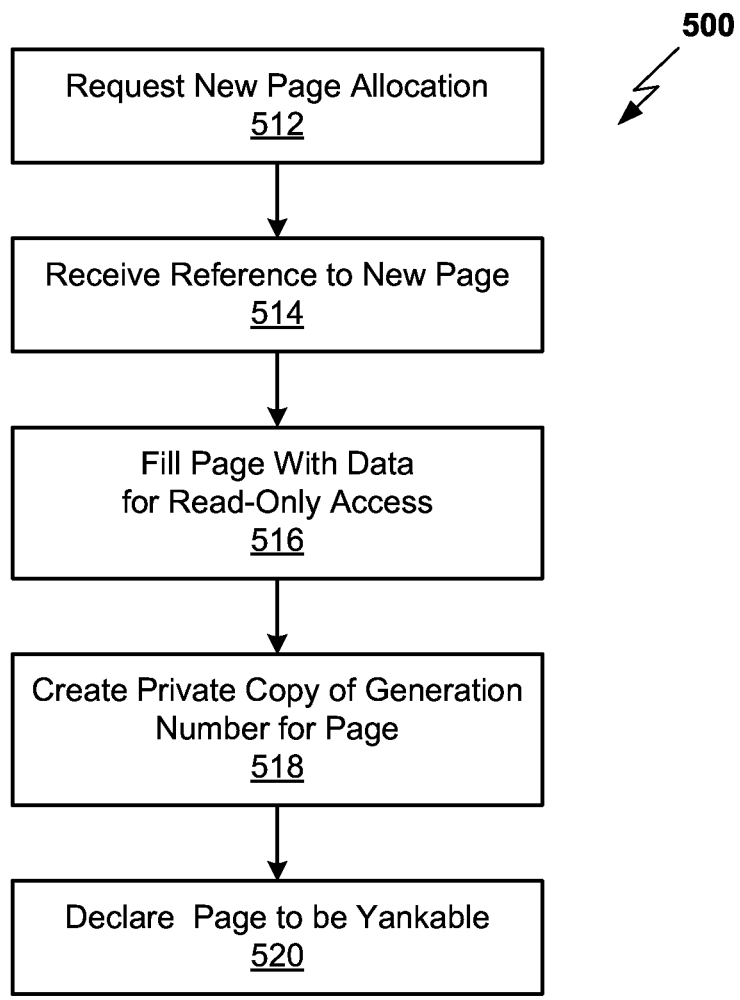
FIG. 5A is a flow diagram of method steps, performed by a memory consumer, for allocating a page of memory.

FIG. 5A is a flow diagram of method steps 500, performed by a memory consumer, for allocating a page of memory. Although the method steps are described in conjunction with the system of FIGS. 1-3, it should be understood that there are other systems in which the method steps may be carried out without departing the scope and spirit of the present invention.

In one or more embodiments, a usage model for a data object implemented by a memory consumer is evaluated. If the data object is configured to store information that is available from a reliable second source, then the data object may be implemented using pages of yankable memory. If the data object is configured to store uniquely available information, then the data object should not be implemented using yankable memory.

The method begins in step 512, where the memory consumer requests a new page allocation from the memory manager. In step 514, the memory consumer receives a reference to the new page from the memory manager. In step 516, the memory consumer fills the page with data for subsequent read-only access. In step 518, the memory consumer creates a private copy of a generation number associated with the new page. In step 520, the memory consumer declares the page to be yankable to the memory manager, which places the page on free list 210 of FIGS. 2A-2F. The method terminates in step 520.

Figure 5B:
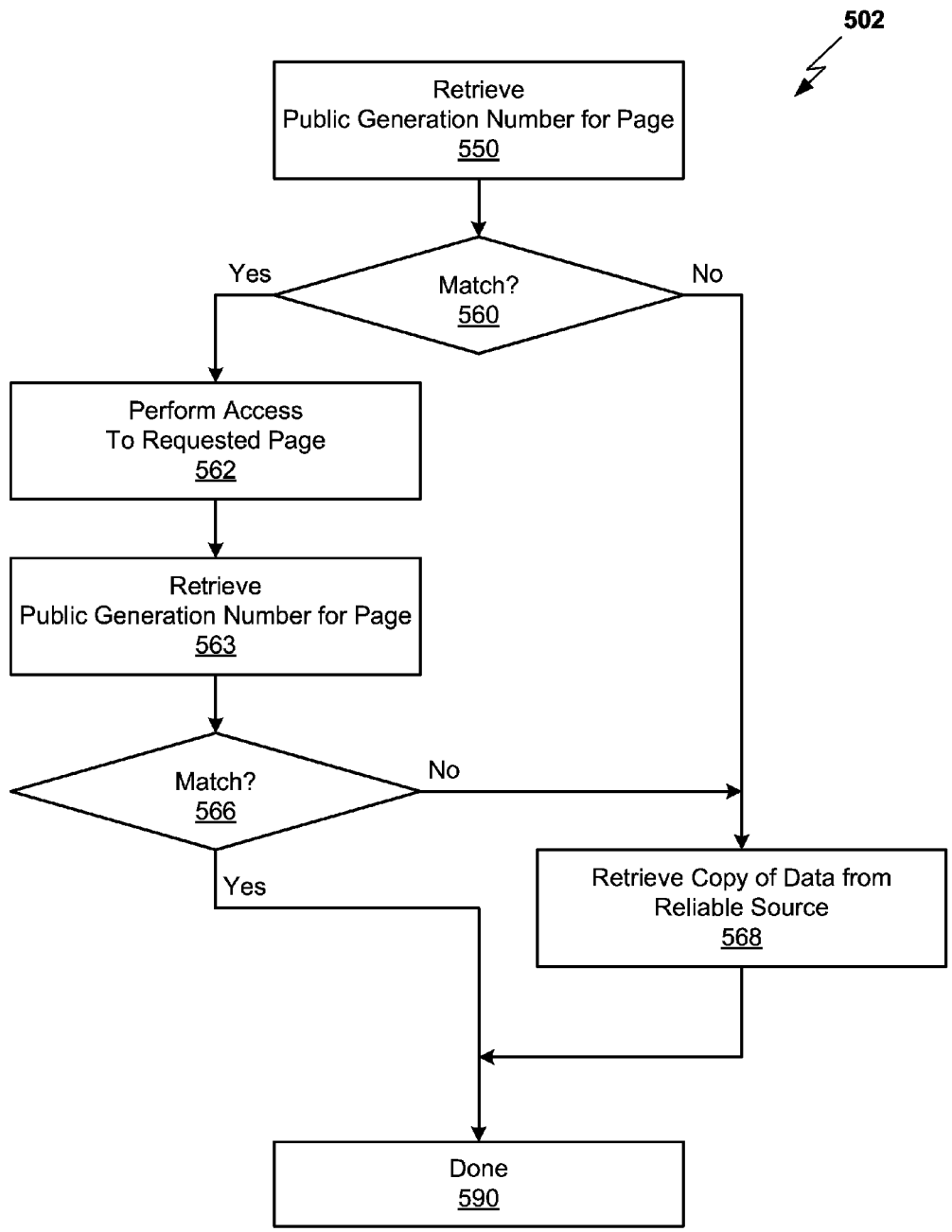
FIG. 5B is a flow diagram of method steps, performed by a memory consumer, for reading a page of memory.

FIG. 5B is a flow diagram of method steps 502, performed by a memory consumer, for reading a page of memory. Although the method steps are described in conjunction with the system of FIGS. 1-3, it should be understood that there are other systems in which the method steps may be carried out without departing the scope and spirit of the present invention.

The method begins in step 550, where the memory consumer retrieves a public generation number for a page the memory consumer is preparing to read. If, in step 560, the public generation number matches a private generation number maintained by the memory consumer, then the method proceeds to step 562, where the memory consumer performs a read-only request to the page. If the public generation number does not match the private generation number maintained by the memory consumer, then the method proceeds to step 568, where the memory consumer retrieves a copy of the data from a reliable source.

After the read is carried out in step 562, the memory consumer retrieves the public generation number once more in step 563 to confirm in step 566 that it has not changed. It should be recognized that the public generation number would have changed if the memory page is allocated to another memory consumer while steps 560 and 562 are being carried out, and in such cases, the read carried out in step 562 would be invalid and step 568 would be carried out after step 566. If, in step 566, the public generation number still matches the private generation number, then the read data is considered valid and the method terminates in step 590.

Figure 6:
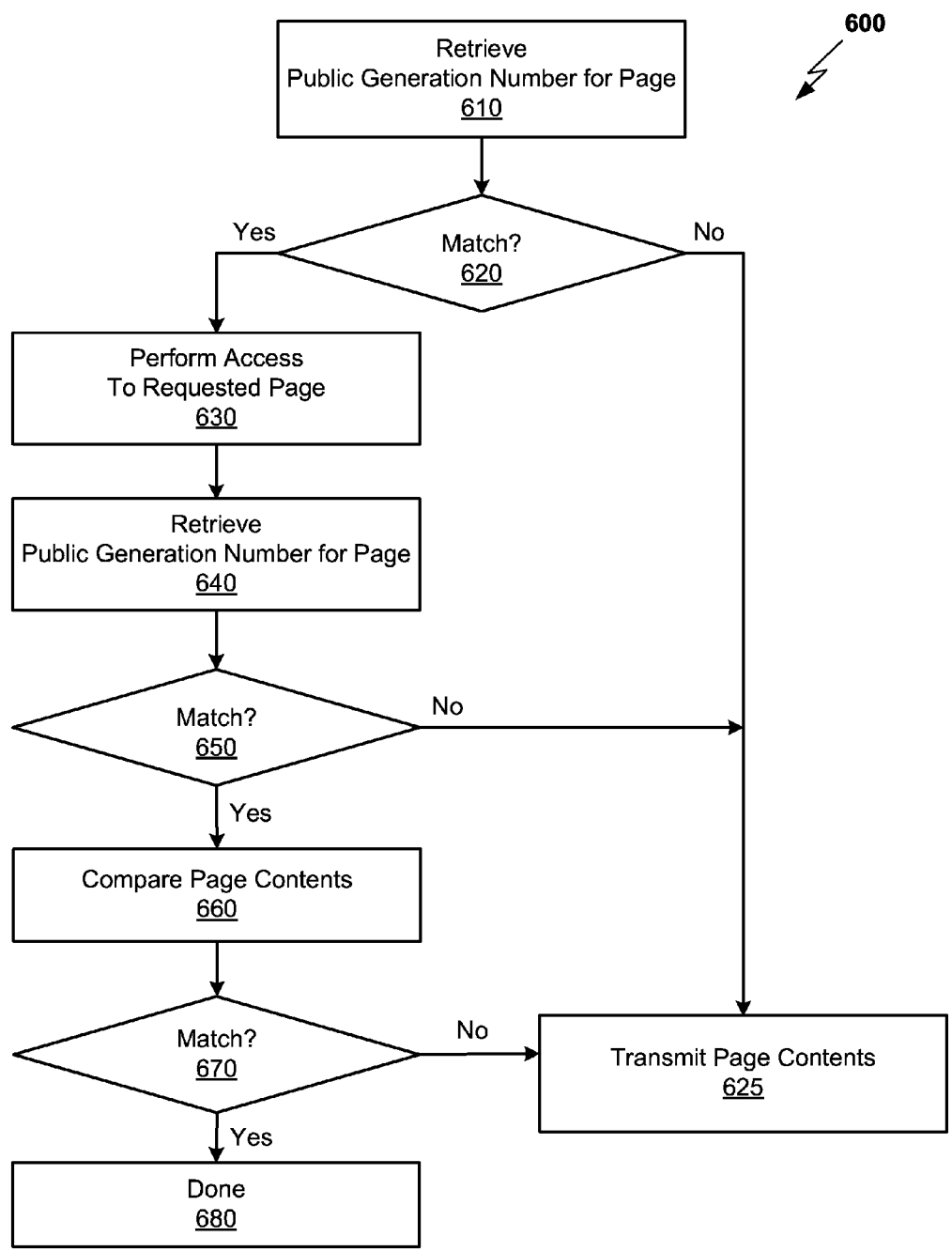
FIG. 6 is a flow diagram of method steps, performed by a live migration module, for determining whether or not to transmit a dirty memory page to a destination.

FIG. 6 is a flow diagram of method steps 600, performed by a memory consumer, during live migration of a virtual machine from a source computer system to a destination computer system. As known in the art, during live migration, memory pages representing the working state of the virtual machine are transmitted from the source to the destination over several pre-copy iterations. Memory pages that are marked "dirty" during any pre-copy iteration are copied to the destination in the next pre-copy iteration. When the set of dirty memory pages is sufficiently small after a pre-copy iteration, the virtual machine is stunned at the source and, after the dirty memory pages have been copied to the destination, resumes execution at the destination.

Sometimes, the memory pages that are marked dirty during a pre-copy iteration are not modified at all (e.g., rewritten with the same data), which means that such memory pages need not be copied to the destination. As a way to determine whether dirty memory pages have indeed been modified during a pre-copy iteration, memory pages representing the working state of the virtual machine that are copied to the destination during any pre-copy iteration are stored in pages of yankable memory. FIG. 6 is a flow diagram of a method that is carried out by a live migration module to determine whether a memory page that has been marked dirty during a pre-copy iteration has been modified or not.

The method begins in step 610, where the live migration module retrieves a public generation number for the page in yankable memory containing the previously transmitted contents of the dirty memory page. If, in step 620, the public generation number matches a private generation number maintained by the live migration module for that page in yankable memory, the method proceeds to step 630, where the live migration module performs a read-only request to the page. If the public generation number does not match the private generation number, the method proceeds to step 625, where the live migration module transmits the current contents of the dirty memory page to the destination.

After the read is carried out in step 630, the live migration module retrieves the public generation number once more in step 640 to confirm in step 650 that it has not changed. It should be recognized that the public generation number would have changed if the page of yankable memory containing the previously transmitted contents of the dirty memory page is allocated to another memory consumer while steps 620 and 630 are being carried out, and in such cases, the read carried out in step 630 would be invalid and step 625 would be carried out after step 650. If, in step 650, the public generation number still matches the private generation number, the read data is considered valid and is compared against the current contents of the dirty memory page in step 660. If the contents do not match, it is determined that the dirty memory page has indeed been modified, and step 625 is carried out to transmit the current contents of the dirty memory page to the destination. If the contents match, it is determined that the dirty memory page has not been modified, and the method ends in step 680 without the contents of the dirty memory page being transmitted to the destination.

In sum, a technique is disclosed for managing memory in scenarios where a memory consumer can continue to operate correctly given a loss of a page of allocated memory. Two categories of pages may exist within this memory management regime. One category is identical to traditional pages of memory, which are allocated and kept by a memory consumer until released, after which no further accesses are permitted. A second category allows pages associated with a memory consumer to be yanked from the memory consumer at any time. This second category of page is applicable to certain common applications including, without limitation, caching. In one embodiment, pages of memory are marked with a public generation number, which increments every time the page is allocated. Each memory consumer maintains a private copy of the public generation number for each page. Prior to accessing data within a page of yankable memory, the memory consumer compares public and private generation numbers. If the generation numbers match, then the page may be accessed, if the generation numbers do not match, then the memory consumer must either proceed without the requested data, or the memory consumer must retrieve a copy of the requested data form a reliable source. In an alternative embodiment, yankable pages are mapped via a virtual mapping scheme. A yankable page is mapped during allocation and de-mapped if the memory manager yanks the page back. A try-catch scheme is implemented to avoid memory faults that may arise when the memory consumer attempts to access a yanked page.

According to another embodiment of the present invention, certain contents may be stored in yankable memory and discarded if the public generation number does not match the stored private generation number. These examples include: (1) storing a real, continuous signal from a signal processing card in yankable memory, such that even if some contents are lost as a result of the page being allocated to another memory consumer, quantization can continue, albeit with a slight loss in accuracy; (2) storing a large set of data points (e.g., disk latency values) in yankable memory to perform data fitting to a curve, such that even if some contents are lost as a result of the page being allocated to another memory consumer, curve fitting can continue, albeit with a slight loss in accuracy; (3) storing crypto-secure signatures of previously migrated pages in yankable memory using which comparisons can be done with newer version of those pages and differences can be sent in the form of diff compression, such that even if some contents are lost, this process can still provide better network bandwidth utilization for those pages that still have crypto-secure signatures stored in yankable memory; and (4) storing a cache of information about pages previously transmitted to a destination in yankable memory and sending unique identifiers of previously transmitted pages to the destination instead of the page data, such that even if some contents are lost, this process can still prevent repeat data transmissions to the destination for those pages that still have their information stored in yankable memory.

D. Additional Embodiments

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless of the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method of managing memory using a free list of memory pages, said method comprising:
   receiving a memory allocation request from a memory consumer;
   selecting a memory page from the free list; and
   allocating the memory page to the memory consumer,
   wherein the free list, after said allocating, includes the allocated memory page, and the memory consumer retains a reference to the allocated memory page in the free list.

2. The method of claim 1, wherein the free list includes a head and a tail and memory pages closer to the head are allocated prior to memory pages closer to the tail.

3. The method of claim 2, wherein the memory page is selected from the head of the free list to be allocated to the memory consumer.

4. The method of claim 3, wherein said allocating includes:
   removing the allocated memory page from the free list; and
   adding the allocated memory page to the free list at the tail of the free list.

5. The method of claim 1, wherein said allocating includes:
   incrementing a generation number for the memory page; and
   returning a pointer to the memory page and a generation number for the memory page to the memory consumer,
   wherein the generation number is incremented each time the memory page is allocated.

6. The method of claim 1, further comprising:
   adding a memory page that is not referenced by any memory consumer to the head of the free list.

7. The method of claim 1, wherein the free list of memory pages includes memory pages that are not referenced by any memory consumer and memory pages that are referenced by one or more memory consumers.

8. The method of claim 7, wherein the unreferenced memory pages are positioned nearer to head of the free list than the referenced memory pages.

9. The method of claim 1, further comprising:
   receiving a memory allocation request from another memory consumer;
   selecting a memory page from the free list; and
   removing the selected memory page from the free list and then allocating the selected memory page to said another memory consumer.

10. The method of claim 9, wherein said allocating in each instance increments a generation number for the selected memory page that has been allocated.

11. A non-transitory computer-readable medium having stored therein instructions for causing a processing unit to carry out the step of ordering a list of free memory pages such that free memory pages that are currently unreferenced by a memory consumer are allocated prior to free memory pages that are currently referenced by a memory consumer.

12. The non-transitory computer-readable medium of claim 11, further having stored therein counters for each of the memory pages in the free list.

13. The non-transitory computer-readable medium of claim 12, wherein the instructions cause the processing unit to carry out the step of incrementing a counter when a memory page in the free list corresponding thereto is allocated to a memory consumer.

14. The non-transitory computer-readable medium of claim 11, wherein said ordering includes repositioning a free memory page to a tail of the list each time the free memory page is read without being removed from the list of free memory pages.

15. The non-transitory computer-readable medium of claim 11, wherein said ordering includes positioning a newly released free memory page to a head of the list when the newly released free memory page is added to the list of free memory pages.

16. A non-transitory computer-readable medium storing instructions that, when executed by a processor, cause the processor to execute a method comprising:
   receiving a memory allocation request from a memory consumer;
   selecting a memory page from the free list; and
   allocating the memory page to the memory consumer,
   wherein the free list, after said allocating, includes the allocated memory page, and the memory consumer retains a reference to the allocated memory page in the free list.

17. The non-transitory computer-readable medium of claim 16, wherein:
   the free list includes a head and a tail and memory pages closer to the head are allocated prior to memory pages closer to the tail.

18. The non-transitory computer-readable medium of claim 16, wherein said allocating includes:
   incrementing a generation number for the memory page; and
   returning a pointer to the memory page and a generation number for the memory page to the memory consumer,
   wherein the generation number is incremented each time the memory page is allocated.

19. The non-transitory computer-readable medium of claim 16, wherein the free list of memory pages includes memory pages that are not referenced by any memory consumer and memory pages that are referenced by one or more memory consumers.

20. The non-transitory computer-readable medium of claim 16, wherein:
   the unreferenced memory pages are positioned nearer to a head of the free list than the referenced memory pages.

* * * * *